United States Patent [19]
Yuan et al.

[11] Patent Number: 6,034,756
[45] Date of Patent: *Mar. 7, 2000

[54] LCDS WITH WIDE VIEWING ANGLE

[75] Inventors: Haiji Yuan, Cupertino; Thomas G. Fiske, Campbell, both of Calif.; Louis D. Silverstein, Scottsdale, Ariz.; Jack R. Kelly, Monroe Falls, Ohio

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/854,338

[22] Filed: May 12, 1997

[51] Int. Cl.[7] .................................................. G02F 1/1335
[52] U.S. Cl. ............................ 349/119; 349/118; 349/117
[58] Field of Search .................................... 349/117, 118, 349/119

[56] References Cited

U.S. PATENT DOCUMENTS

| | | |
|---|---|---|
| 5,396,351 | 3/1995 | Gessel . |
| 5,583,679 | 12/1996 | Ito et al. . |
| 5,619,352 | 4/1997 | Koch et al. ............................... 349/119 |
| 5,659,378 | 8/1997 | Gessel . |
| 5,767,937 | 6/1998 | Sumiyoshi ............................... 349/119 |
| 5,796,456 | 8/1998 | Takatori et al. ......................... 349/119 |
| 5,805,253 | 9/1998 | Mori et al. ............................... 349/118 |

FOREIGN PATENT DOCUMENTS

| | | |
|---|---|---|
| 0 758 013 A1 | 2/1997 | European Pat. Off. . |
| 0 774 683 A2 | 5/1997 | European Pat. Off. . |
| 9-61624 | 3/1997 | Japan . |
| 9-292516 | 11/1997 | Japan . |
| 2 306 016 | 4/1997 | United Kingdom . |

OTHER PUBLICATIONS

H. Mori et al., "Optical Performance of a Novel Compensation Film for Wide–Viewing–Angle TN–LCDs" AM–LCD '96/IDW '96, pp. 189–192.

Kondo et al., Wide–Viewing–Angle Displays with In–Plane Switching Mode of Nematic LCs Addressed by 13.3–in. XGA TFTs, SID 96 Digest, pp. 81–84, 1996.

Miyashita et al., Properties of the OCB Mode for Active–Matrix LCDs with Wide Viewing Angle, SID 95 Digest, pp. 797–800, 1995.

K.H. Yang, Two–Domain Twisted Nematic and Tilted Homeotropic Liquid Crystal Displays for Active Matrix Applications, 1991 IEEE, pp. 68–72, 1991.

Hsieh et al., Optical Properties and Fabrication of the Spin–Coated Polycarbonate Retardation Film, SID 96 Digest, pp. 588–591, 1996.

McFarland et al., Invited SpectraVue Viewing Angle Enhancement System for LCDs, Asia Display '95, pp. 739–742, 1995.

Chen et al., Four–Domain TN–LCDs Using Low and High Pretilt Alignment Layers, SID 96 Digest, pp. 650–653, 1996.

*Primary Examiner*—William L. Sikes
*Assistant Examiner*—Joanne Kim
*Attorney, Agent, or Firm*—Oliff & Berridge, PLC

[57] ABSTRACT

A compensating layer for an active matrix liquid crystal display where the compensating layer has optical axis oriented according to the orientation of the liquid crystal cell directors at a particular state. The compensating layer results in a very large usable viewing volume without sacrificing display efficiency when compared to other wide angle viewing techniques.

13 Claims, 13 Drawing Sheets

LCDS WITH WIDE VIEWING ANGLE

BACKGROUND OF THE INVENTION

1. Field of Invention

This invention generally relates to a transmissive, rear-illuminated liquid crystal display (LCD) having unique retardation films (compensating films) that increase the effective viewing volume of the display.

2. Description of Related Art

Liquid crystal displays (LCD) are replacing other display devices, such as CRTs, as LCD technology matures. Most liquid crystal (LC) materials are uniaxial. Uniaxial materials possess one unique axis, the optic axis, which is parallel to the long axis of the LC molecules. LC materials are also anisotropic, which gives them the optical property of birefringence. Birefringence is the phenomenon of light traveling with different velocities in crystalline material, depending on the propagation direction and orientation of polarized light relative to the crystalline axes. This implies an index of refraction, $n_e$, for the unique or extraordinary direction that is different than the index of refraction $n_o$ for the ordinary direction. When $\Delta n = n_e - n_o$ is positive, the LC material is said to have positive birefringence.

FIG. 1 shows a conventional transmissive direct-view twisted-nematic LCD 100 that includes a backlight source 105 and an optical stack 106 that includes a number of layered optical elements that modify the polarization state and the spectral composition of light originating from the backlight source 105. The elements include rear polarizer 110 with a direction of polarizer transmitting axis indicated by lines 112, retardation films 120, LC cell 130, a voltage source 140, and an front polarizer 150 that serves as a polarization state analyzer.

The LC cell 130 includes LC material 138 disposed between a rear substrate 131 and a front substrate 132. Between the front and the rear substrates 132 and 131, respectively, and LC material 138 are front electrodes 134 and rear electrodes 133. Next are a rear polyimide film 135 and a front polyimide film 136. The voltage source 140 is connected to the rear electrodes 133 and the front electrodes 134.

LC cells such as LC cell 130 are defined by both the type of LC material used in the cell and the way light propagates through the cell. One such LC cell configuration is the twisted-nematic (TN) cell. Assuming the LCD 100 is a TN cell, light from backlight source 105 is linearly polarized by the rear polarizer 110 and then the optic axis is rotated by the TN LC cell 130. The amount of rotation is determined by the birefringence and thickness of the LC cell 130 as well as the twist angle of the LC cell 130 and the wavelength of the light. For example, many TN-LCDs use a 90-degree rotation. The 90degree rotation may be established by rubbing the polyimide films 135 and 136 and then orienting the polyimide films 135 and 136 such that the rubbing directions differ by 90 degrees. The LC molecules adjacent to the polyimide films 135 and 136 tend to align in the rubbing directions. Polyimide films may also be manufactured to provide a pre-tilt angle $\theta_o$ for the LC molecules within the LC cell 130. The pre-tilt angle $\theta_o$ ensures that the LC molecules tilt in the desired direction when a control voltage is applied to the front and the rear electrodes 134 and 133 by the voltage source 140.

After rotation of the optic axis, the polarization state of light exiting the LC cell 130 is analyzed by the front polarizer or analyzer 150. Because the polarization axes of the rear polarizer 110 and the analyzer 150 are crossed, the LCD will appear white when no voltage is supplied from the voltage source 140 to the electrodes 133 and 134. This configuration is called normally-white (NW).

Although the LC material 138 is homogenous, it is convenient to consider the LC material 138 as including a number of layers as shown in FIG. 1. Such terminology is well known in the art. Thus, FIG. 1 shows five layers of LC molecules, or directors, L1–L5. The optic axis of each layer L1–L5 is aligned with the axis of the director as shown in FIG. 1.

As shown in FIG. 1, the LCD 100 employs retardation films or compensating layers 120. As will be described later, the compensating layers 120 improve the viewing angle between the display and the viewer.

The LCD 100 operates in a number of "states". In the voltage "OFF" state, the directors within the LC cell 130 are aligned as shown in FIG. 1, and light is effectively transmitted through the optical stack 106. When the voltage from voltage source 140 to the electrodes 133 and 134 increases, the directors begin to tilt, and the twisted structure straightens. FIG. 2 shows the LCD 100 in the voltage "FULL-ON" state. Maximum tilt is achieved at the center of the LC cell 130 (such as L3) while the directors adjacent to the rear substrate 131 and the front substrate 132 experience relatively little tilt.

With the control voltage (typically 3–6 volts) applied, the optic axis of the central portion of the LC cell 130 is predominately parallel to the electric field and the twisted structure disappears as shown in FIG. 2. The polarized direction of the light is no longer rotated, and light passing through the LC cell 130 intersects the analyzer in the cross position, where it is absorbed, causing the activated portion of the display to appear dark.

FIG. 3 plots electro-distortion curves for a specific LC material. The curves show tilt angle $\theta$ and twist angle $\Phi$ as a function of the ratio of applied voltage V and a threshold voltage $V_c$. As shown in FIG. 3, for a given control voltage, the tilt angle $\theta$ increases to a maximum value near a central region of the cell and is at a minimum value near the boundaries of the LC cell adjacent to the substrates. Also as shown in FIG. 3, the maximum tilt angle $\theta$ increases as the control voltage V to the electrodes increases. FIG. 3 also shows the effect of applying voltage to the electrodes in that the twist angle changes more rapidly with cell thickness in the central region of the LC cell compared to the boundaries of the LC cell.

One drawback to using LCDs is that contrast ratio and other optical characteristics degrade as the viewing angle increases. Several techniques have been developed to improve viewing angle performance for LCDs. Some methods of improving viewing angle performance include internal modifications such as in-plane switching mode (Kondo, SID 96 Digest, 81 (1996)), optical compensated mode (Miyashita, C.-L. Kuo, M. Suzuki and T. Uchida, SID 95 Digest, 797 (1995)) and multi-domain TN configurations Yang, IDRC 91 Digest, 68 (1991); J. Chen, P. J. Bos, D. L. Johnson, J. R. Kelly, J. Crow, N. D. Kim, SID 96 Digest, 650 (1996)). External modifications include a collimated backlight with a diffusing screen in front of the optical stack (McFarland, S. Zimmerman, K. Beeson, J. Wilson, T. J. Credelle, K. Bingham, P. Ferm, J. T. Yardley, Asia Display' 95, 739 (1995)). However, most of these techniques achieve viewing angle improvement at the cost of either greater manufacturing complexity or degraded optical efficiency. Hence, better ways to improve viewing angle performance without such compromises are highly desirable. One external method that shows more promise with fewer drawbacks is the use of compensating films (or retardation films).

Compensating films are available from a number of manufacturers, such as Nitto Denko, Sanritz and Fuji Film LTD. A typical material is polycarbonate. FIG. 4 shows an example of a compensating layer such as compensating layer 120. The compensating layer in this example is a polycarbonate film of thickness $d_r$ that has been stretched in both the x and y-directions such that $n_x=n_y>n_z$. When polycarbonate is stretched, the chain molecules tend to line up and the material is more polarizable (has a higher index of refraction) along the stretched axes. As a result, light that is polarized perpendicular to the stretch direction will propagate with an ordinary velocity. Another type of material is polystyrene. In the case of polystyrene, the polarizability of the material is greater in a direction perpendicular to the stretch direction. Polystyrene is typical of a material that has a negative birefringence (i.e., $n_e<n_o$). However, compensating films such as compensating layer 120 provide compensation primarily for the LC material near the middle of the LC cell. Because the LC molecules near the LC cell substrates do not orient in a direction parallel to the applied electric field, these portions of the LC cell are not well compensated.

Yet another type of compensating layer is shown in FIG. 5. In FIG. 5, the compensating layer 180 includes CTA (cellulose triacetate) substrate 182, alignment layer 184, and discotic compound layer 186. The optic axis in the CTA substrate 182 is chosen so that it is normal to plane of the LC cell substrate. The optic axis of the discotic compound layer 186 is chosen so that it tilts over the thickness of the discotic compound layer as shown in FIG. 5. Thus, as shown in FIG. 5, the optic axis of the discotic compound layer 186 may change from 4° to 68°, for example. This change in optic axis is designed to mimic to some degree the tilt of the directors in the LC cell. The compensating layer with this tilt can improve the performance of the viewing angle of a TN LCD. Such a compensating layer includes, for example, Fuji film WV Film WideView A™, described in "Optical Performance of a Novel Compensation Film for Wide-Viewing-Angle-TN-LCDs," Mori, Hiroyuki, Yuji Itoh, Yosuhe Nishiura, Taku Nakamurs, Yukio Shinagawa, AM-LCD' 96/IDW' 96, 189, which is hereby incorporated by reference.

FIG. 6 shows viewing angle characteristics of an LCD without a compensating layer. FIG. 6 is an iso-contrast diagram showing horizontal and vertical viewing angles and lines of constant contrast ratio. FIG. 7 is an iso-contrast diagram for the same LCD as in FIG. 6, but with compensating films such as shown in FIG. 5 placed adjacent to the LC cell. As can be seen by comparing FIG. 6 and FIG. 7, the LCD with the compensating film of FIG. 5 has a much better viewing angle performance than that of an LCD without the compensating film. Compensating films such as shown in FIG. 5 attempt to provide compensation for the LC material near the boundaries and the center of the LC cell.

SUMMARY OF THE INVENTION

An object of the present invention is to improve viewing angle performance of a LC display device by using compensating layers that minimize or eliminate undesirable variations of luminance, contrast ratio and chromaticity. Preferred embodiments will become apparent from a reading of the following detailed description taken in connection with the drawings.

BRIEF DESCRIPTION OF THE DRAWINGS

The invention will be described in detail with reference to the following drawings, wherein like reference numerals refer to like elements and wherein.

DETAILED DESCRIPTION OF PREFERRED EMBODIMENTS

Figure 8:
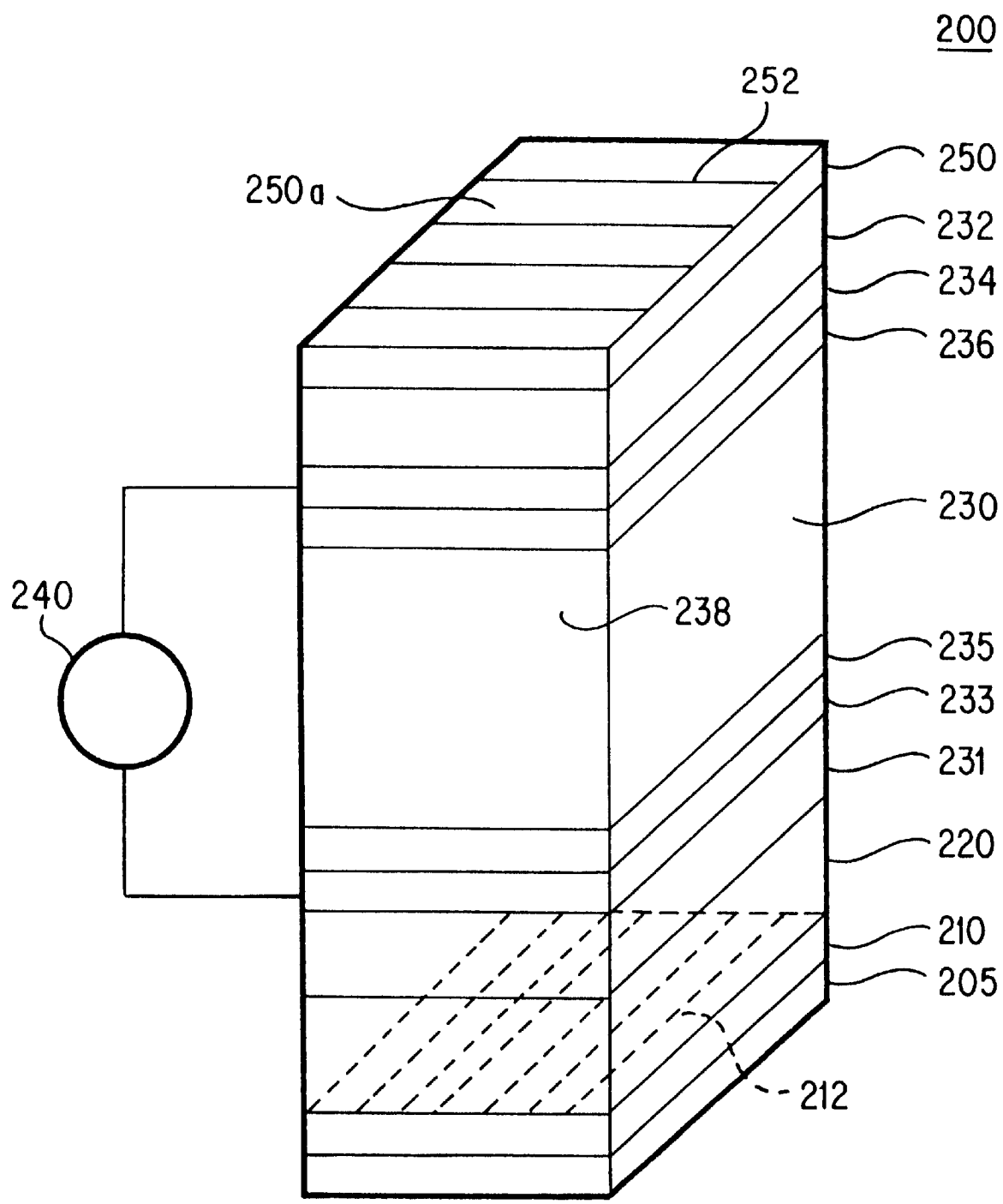
FIG. 8 is a first embodiment of an LCD with first improved compensating layer.

FIG. 8 shows the first embodiment of a compensated LCD 200. The LCD 200 includes backlight source 205, rear polarizer 210, compensating layer 220, LC cell 230, voltage source 240 and analyzer 250. Rear polarizer 210 is oriented so that the direction of the polarizer transmitting axis is shown by lines 212. Similarly, the direction of the polarizer transmitting axis of analyzer 250 is shown by lines 252.

LC cell 230 includes rear substrate 231, front substrate 232, rear electrodes 233, front electrodes 234, rear orientation film 235 and front orientation film 236. The rear substrate 231 and the front substrate 232 are made of a suitable material such as glass, for example. The front and the rear substrates 231 and 232 enclose LC material 238. The orientation films 235 and 236 are likewise made of a suitable material such as polyimide, for example. The rear orientation film 235 is rubbed in a first direction, and the front orientation film 236 is rubbed in a second direction, different from the first direction.

In one aspect of the first embodiment, the LC cell 230 is a 90-degree TN cell with positive birefringence and a left hand twist. The LC cell in this embodiment is constructed in the e-mode (where the LC directors on each side of the LC cell are parallel to the transmitting axis of the adjacent polarizer). One of ordinary skill in the art would appreciate from this specification that other twist orientations, modes, types of LC cells and types of LC material could also be used. For example, ferroelectric liquid crystal (FLC) cells, supertwisted-nematic (STN) cells, polymer dispersed LC cells, polymer stabilized LC cells, optical compensated bend cells, π-cells, and homeotropic (perpendicular) alignment LC cells could also be used. Further, angles other than 90 degrees, such as 50-degree TN cells, could be used.

Figure 9:
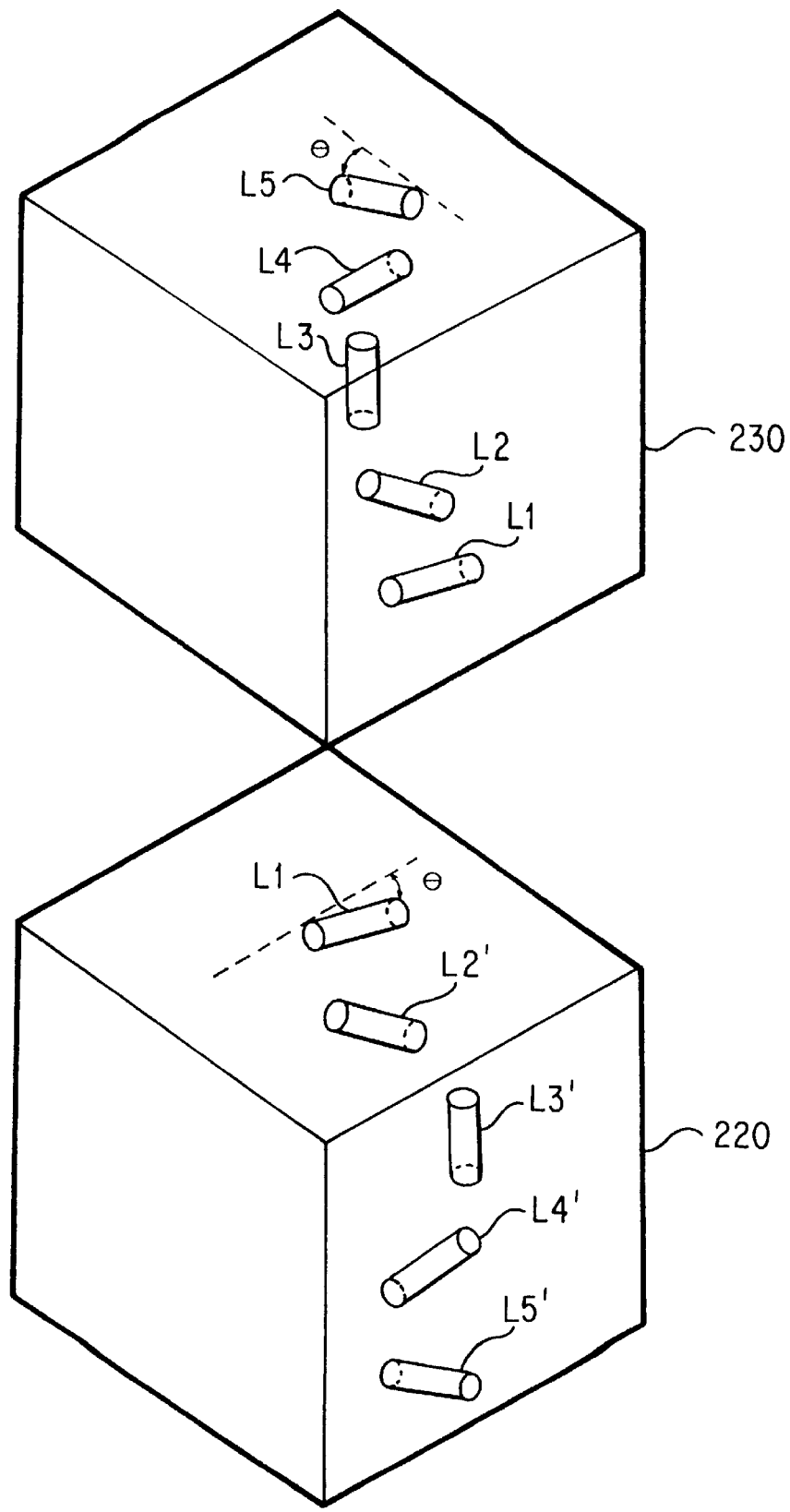
FIG. 9 is an exploded view of the LC cell and the compensating layer of FIG. 8.

FIG. 9 is an exploded view of the LC cell 230 and the compensating layer 220 according to one aspect of the first embodiment. The LCD 200 shown in FIG. 9 is X shown with the control voltage in the FULL-ON state. In FIG. 9, the LC cell 230 includes five "layers" of LC material, L1–L5. Each layer, L1–L5, has a tilt angle θ and a twist angle φ. However, because the LCD 200 is shown in the FULL-ON state, the optic axes of the LC directors nearest the center of the LC cell 230 are substantially normal to the surface 250a.

Also as shown in FIG. 9, the compensating layer 220 has five "layers", L1'–L5'. The structure of the compensating layer 220 is such that the optic axes of the layers L1-L5' mimic the optic axes of the LC cell 230 layers L1–L5. That is, layer L1' has the same tilt angle θ and the same twist angle φ as layer L1. Accordingly, the optic axis of L1' is parallel to the optic axis of L1. As a result, layer L1' compensates layer L1. Similarly, layer L2' compensates layer L2, layer L3' compensates layer L3, etc. In this aspect of the first embodiment, the compensating layer 220 has negative birefringence (i.e., $n_e < n_o$) and the absolute value of Δn' equals the absolute value of Δn. Thus, the compensating layer 220 has negative birefringence and a right-hand twist.

In another aspect of the first embodiment, the LC cell has negative birefringence and the compensating layer has positive birefringence. Also, it should be appreciated that the compensating layer 220 can be placed adjacent to either the front substrate 232 or the rear substrate 231. Alternately, the compensating layer 230 can be split in half with one half adjacent to the front substrate 232 and the other half adjacent to the rear substrate 231, to achieve more symmetric results.

Figure 7:
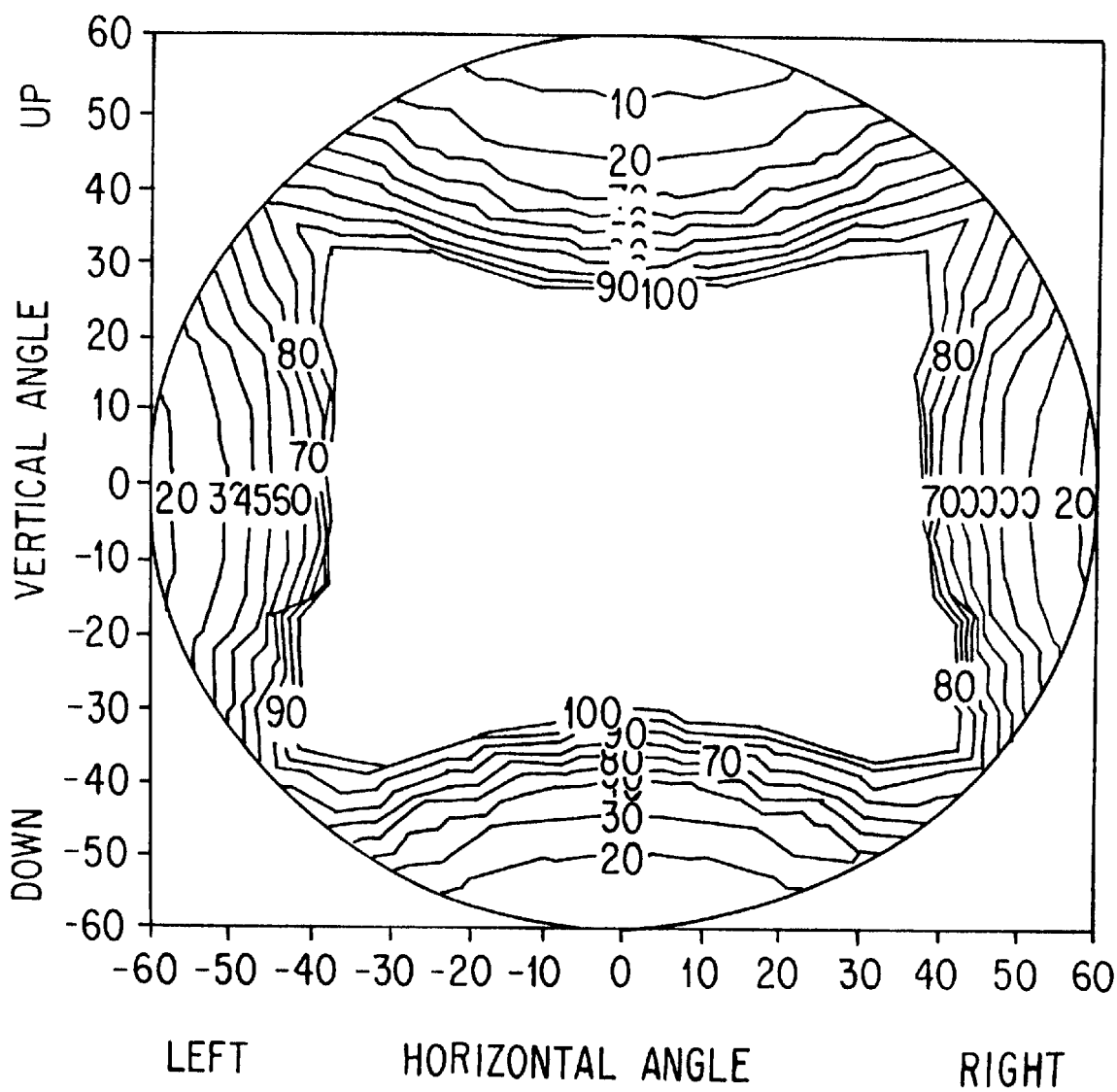
FIG. 7 is an iso-contrast curve showing the performance of the FIG. 1 LCD with the FIG. 5 compensating layer.
Figure 10:
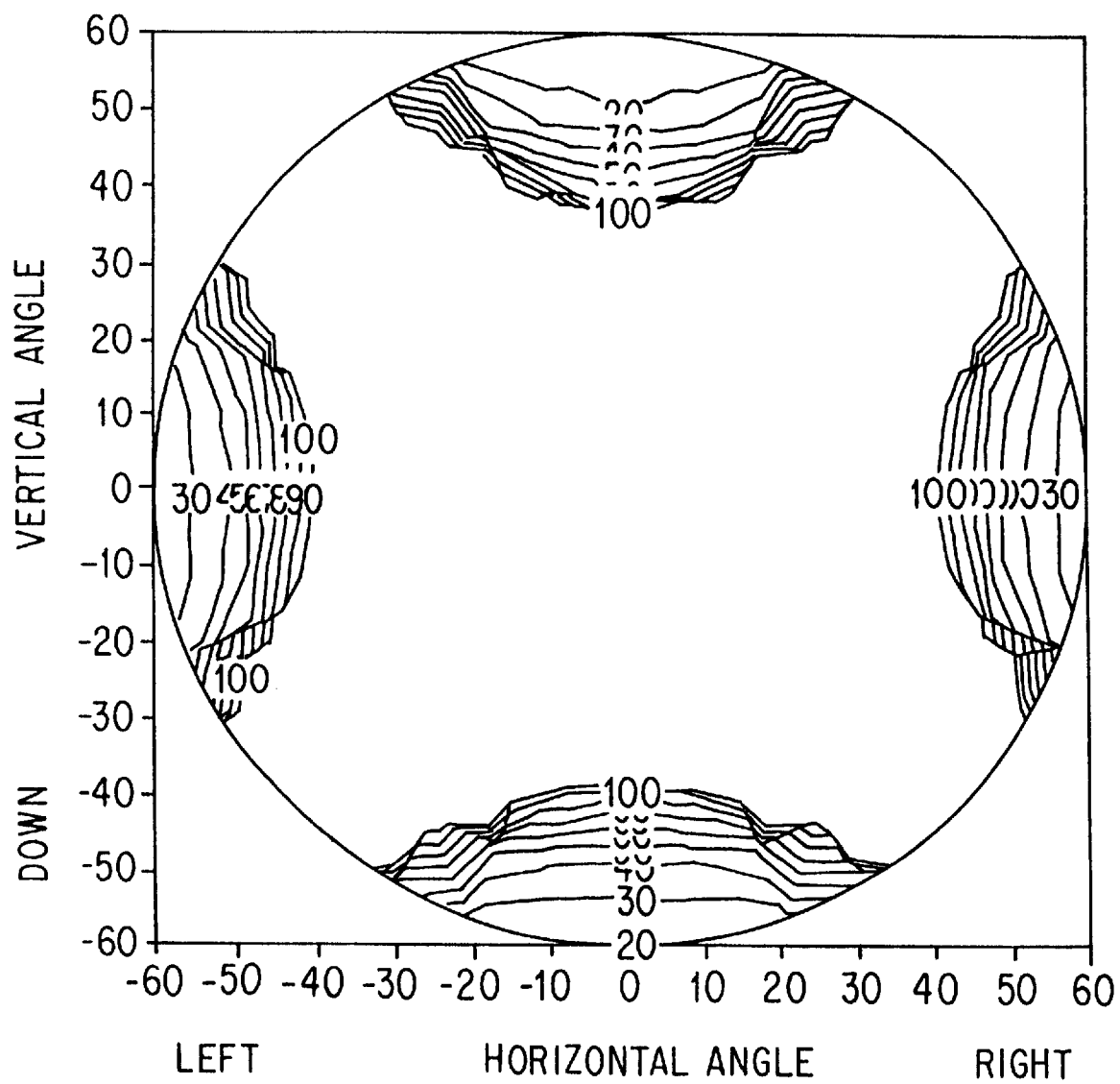
FIG. 10 is an iso-contrast curve of the LCD of FIG. 8.

FIG. 10 shows the viewing angle performance of the LCD 200 using compensating layer 220. As shown in FIG. 10, the wide angle viewing performance is greatly improved over the wide angle viewing performance of the prior art device shown in FIG. 7. The improved performance is a result of each of the "layers" L1–L5 of the LC cell 230 being compensated by each of the "layers" L1'–L5' of the compensating layer 220. In this aspect, Δn·d≅Δn'·d', where d equals the thickness of the LC cell 230 and d' equals the thickness of the compensating layer 220. A typical value for Δn is 0.1 and a typical value for Δn' is −0.05. Accordingly, d equals about 5 microns and d' equals about 10 microns.

Figure 1:
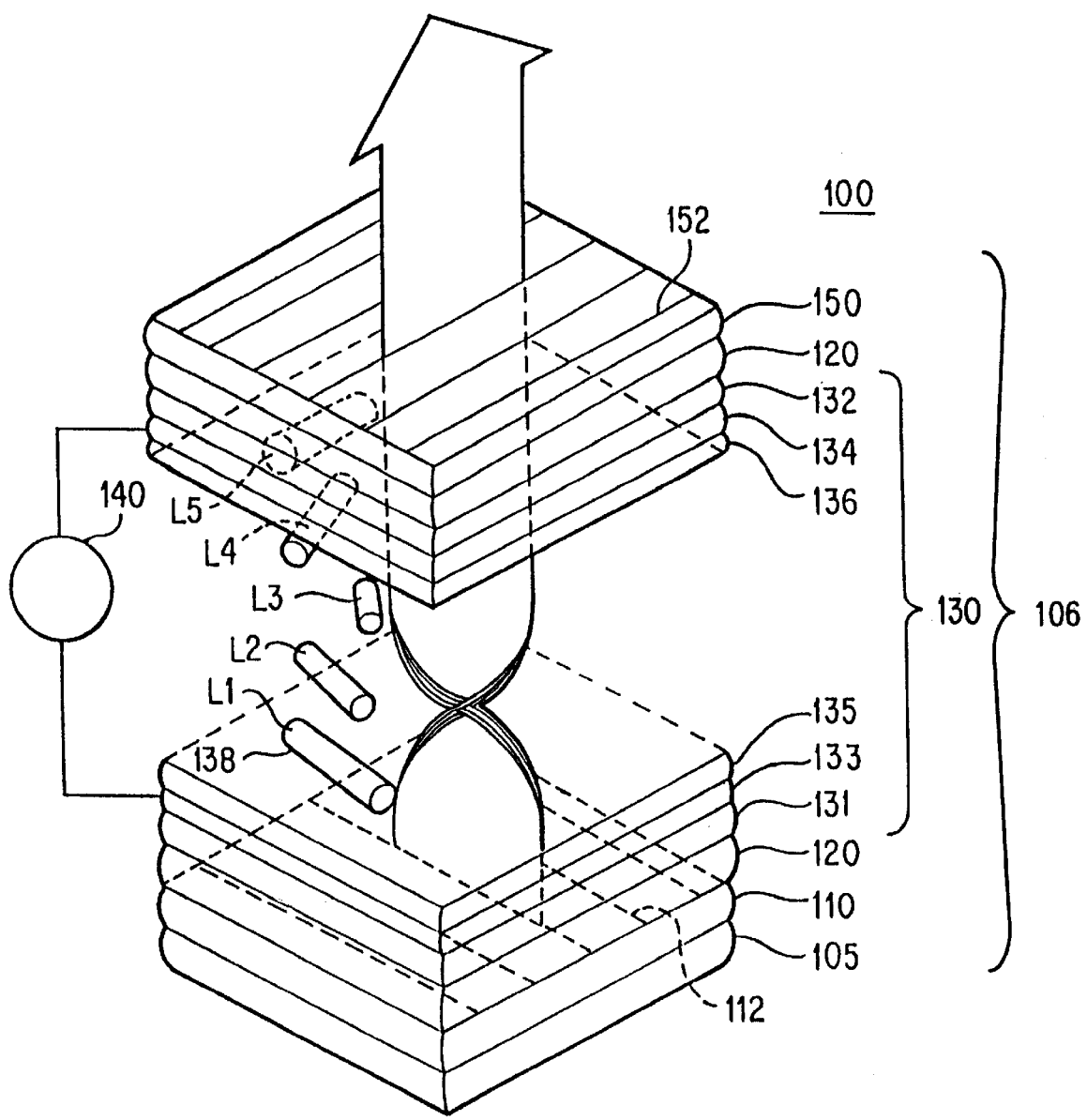
FIG. 1 illustrates an LCD device in the OFF-state.
Figure 2:
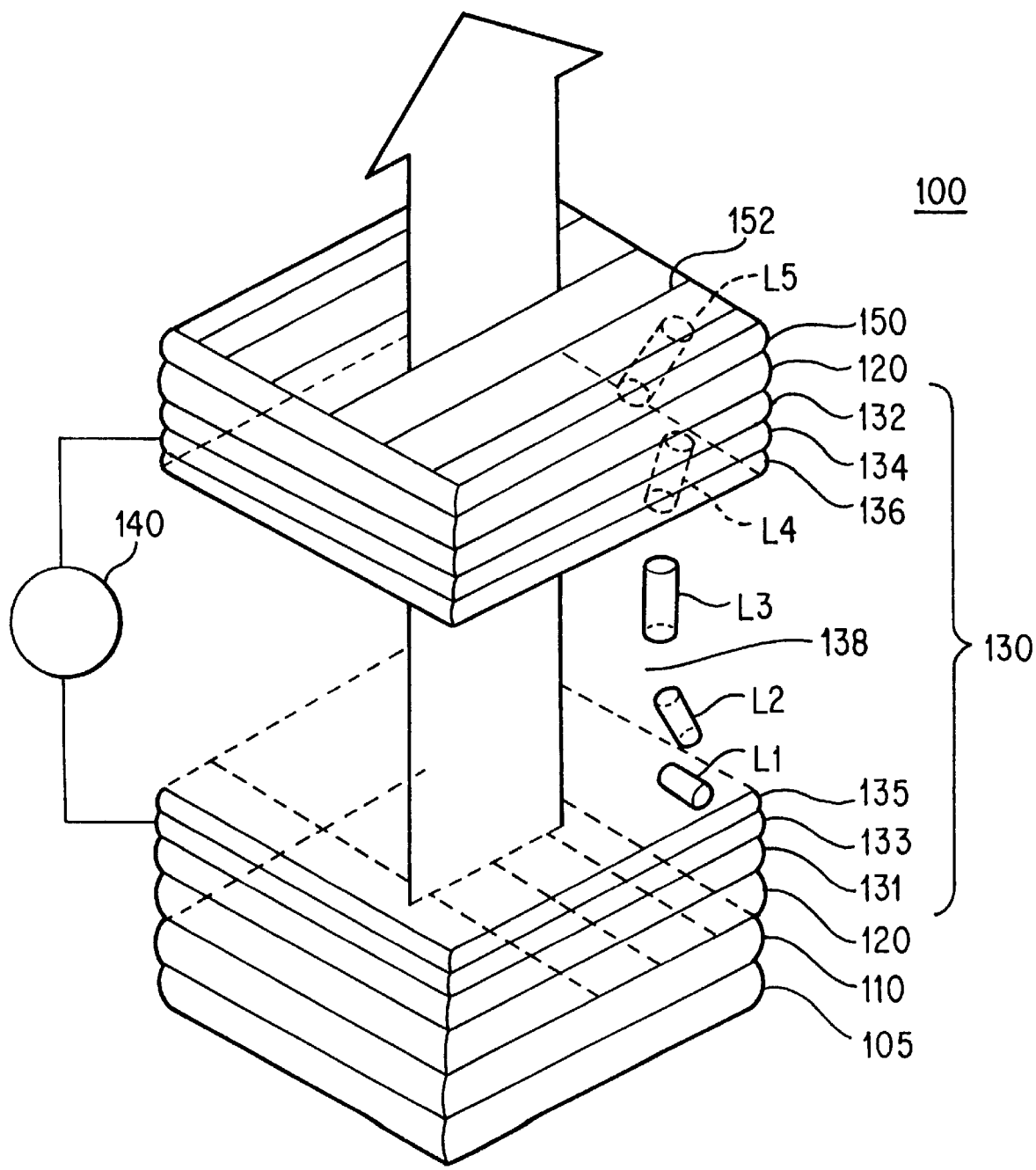
FIG. 2 illustrates the LCD device in the FULL ON-state.
Figure 3:
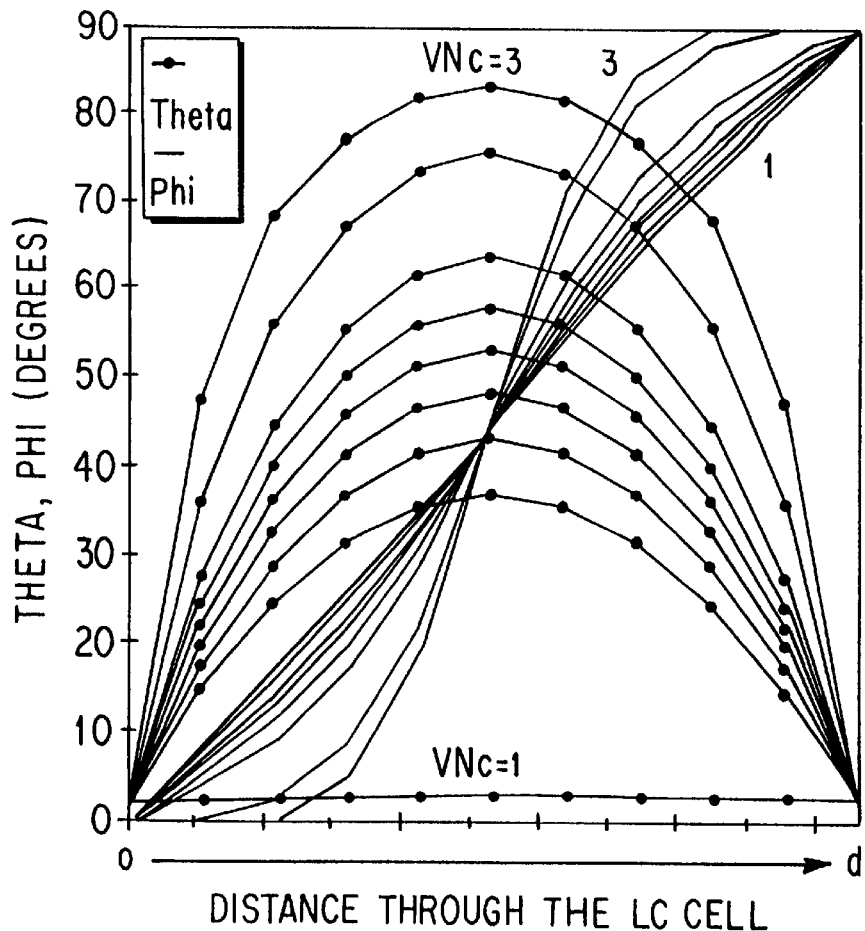
FIG. 3 shows the effect of controlled voltage applied to the electrodes on tilt angle and twist angle.
Figure 4:
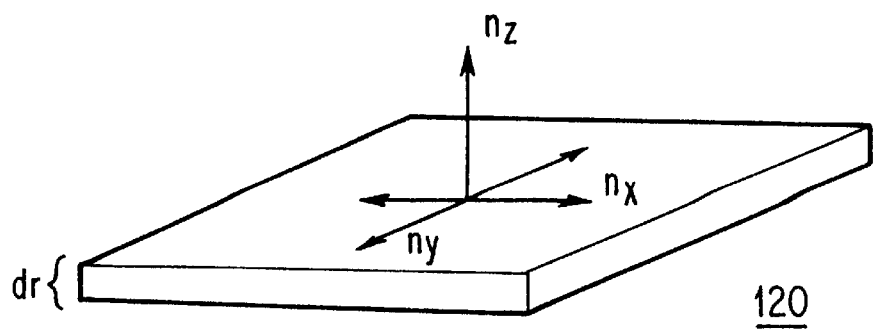
FIG. 4 shows a compensating film that has been stretched in two directions.
Figure 5:
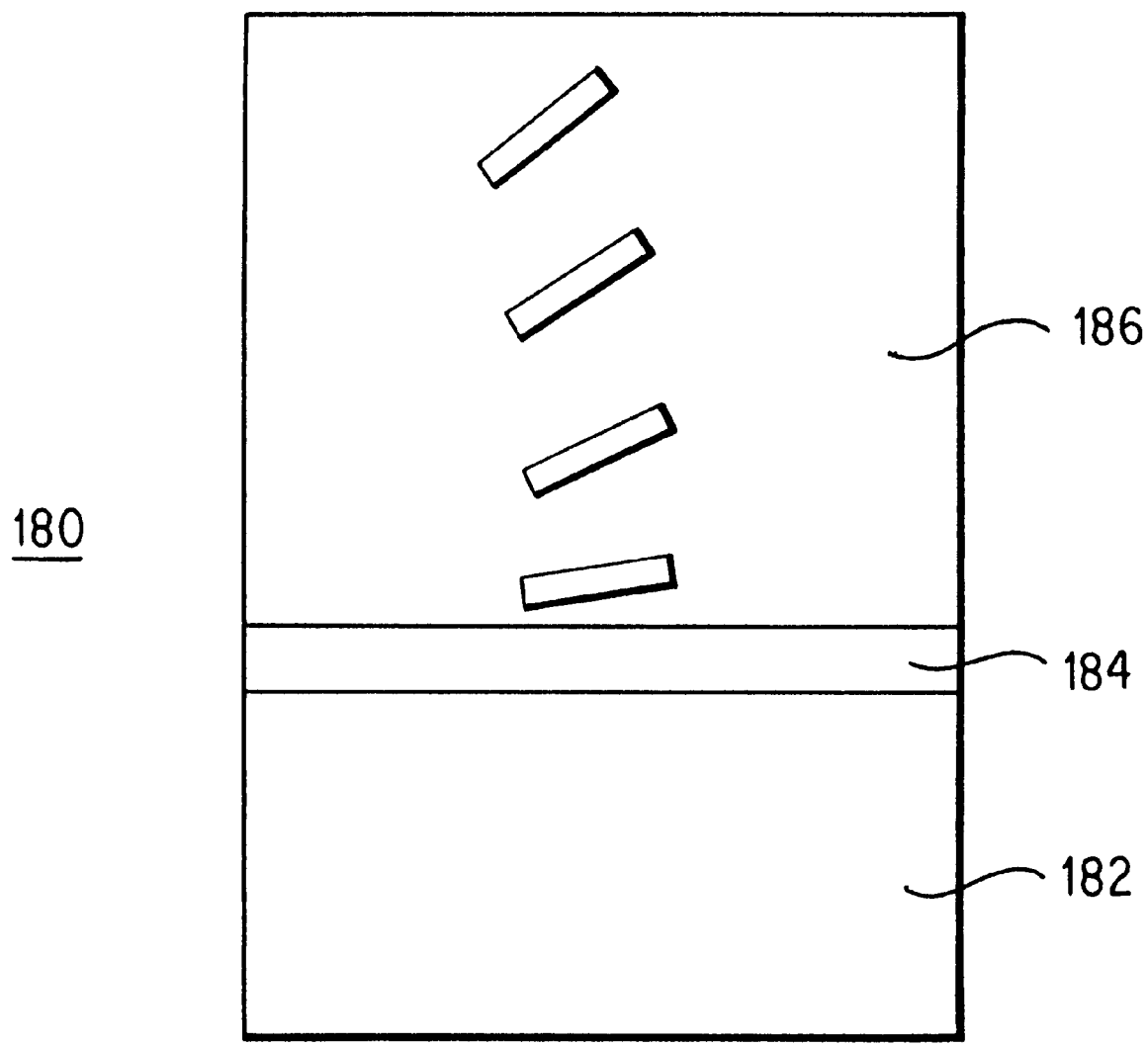
FIG. 5 shows a compensating layer with a tilt structure.
Figure 6:
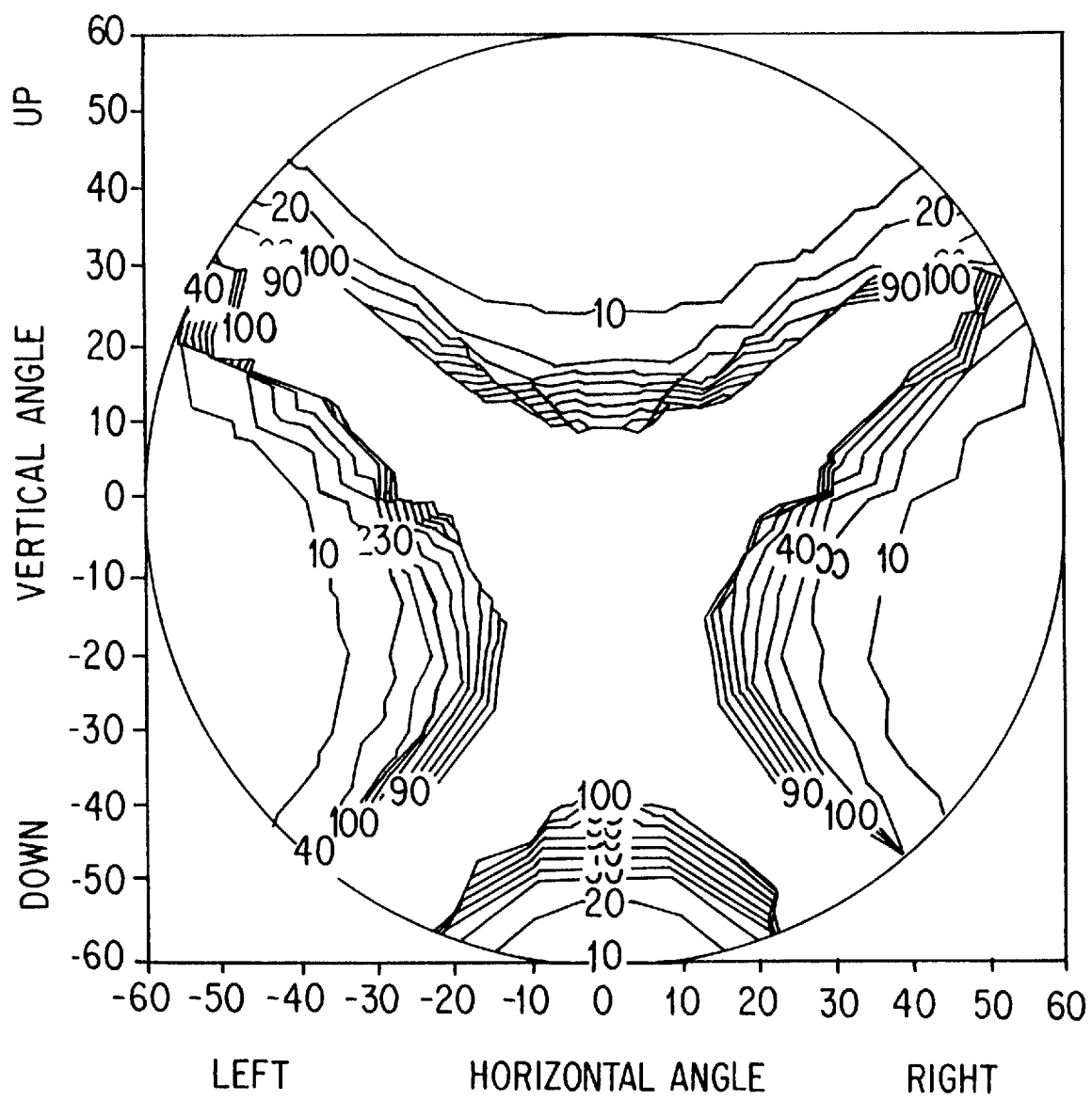
FIG. 6 is an iso-contrast curve showing the performance of the FIG. 1 LCD without the FIG. 5 compensating layer.

In yet another aspect of the first embodiment, the state to be compensated is an intermediate voltage between the OFF state and the FULL-ON state. In this aspect, the layers L1'–L5' of the compensating layer 220 are aligned so that they compensate the LC cell 230 when an intermediate voltage, for example 3 volts, is applied to the front and rear electrodes 234 and 233, respectively. In this aspect, the LC directors will display tilt angles θ and twist angles Φ that correspond to an intermediate voltage such as shown in FIG. 3. The use of such a compensating layer allows for operation of the LCD at a reduced voltage and allows for use of larger LCD panels while minimizing degradation of optical characteristics.

Figure 11:
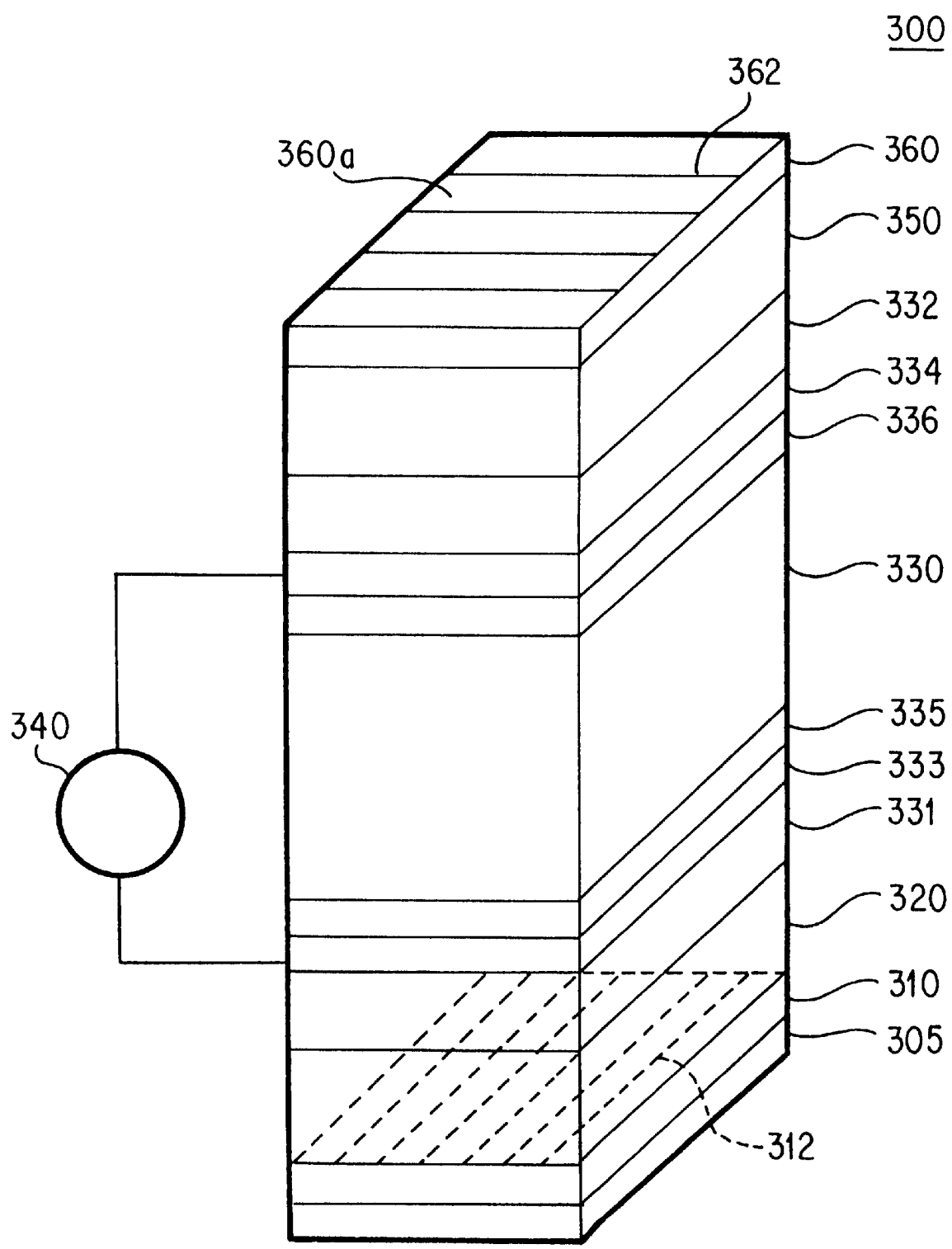
FIG. 11 is a second embodiment of a LCD with a second improved compensating layer.

FIG. 11 shows a second embodiment of the present invention. In FIG. 11, an LCD 300 includes a backlight source 305, a rear polarizer 310, a rear compensating layer 320, an LC cell 330, a voltage source 340, a front compensating layer 350 and a analyzer 360. The direction of the polarizer transmitting axis of the rear polarizer 310 is shown by lines 312 and the direction of the polarizer transmitting axis of the analyzer 360 is shown by lines 362. The LC cell 330 includes rear substrate 331 and front substrate 332, front electrodes 334 and rear electrodes 335 coupled to the voltage source 340, and rear orientation film 335 and front orientation film 336.

In one aspect of the second embodiment, the LC cell 330 is a 90-degree TN cell having positive birefringence. However, one of ordinary skill in the art would appreciate that other orientations and other LC material can be effectively used in this embodiment, including LC material that exhibits negative birefringence.

The LC cell 330 is similar to the LC cell 230 of the first embodiment. In particular, it is convenient to consider the LC cell 330 as including a number of layers, such as layers L1–L5, for example. In the voltage OFF state, each layer L1–L5 has a pre-tilt angle θ and a twist angle φ. In the voltage FULL-ON state, the tilt angle θ and the twist angle 4 change, for example, as shown in FIG. 3.

Figure 12:
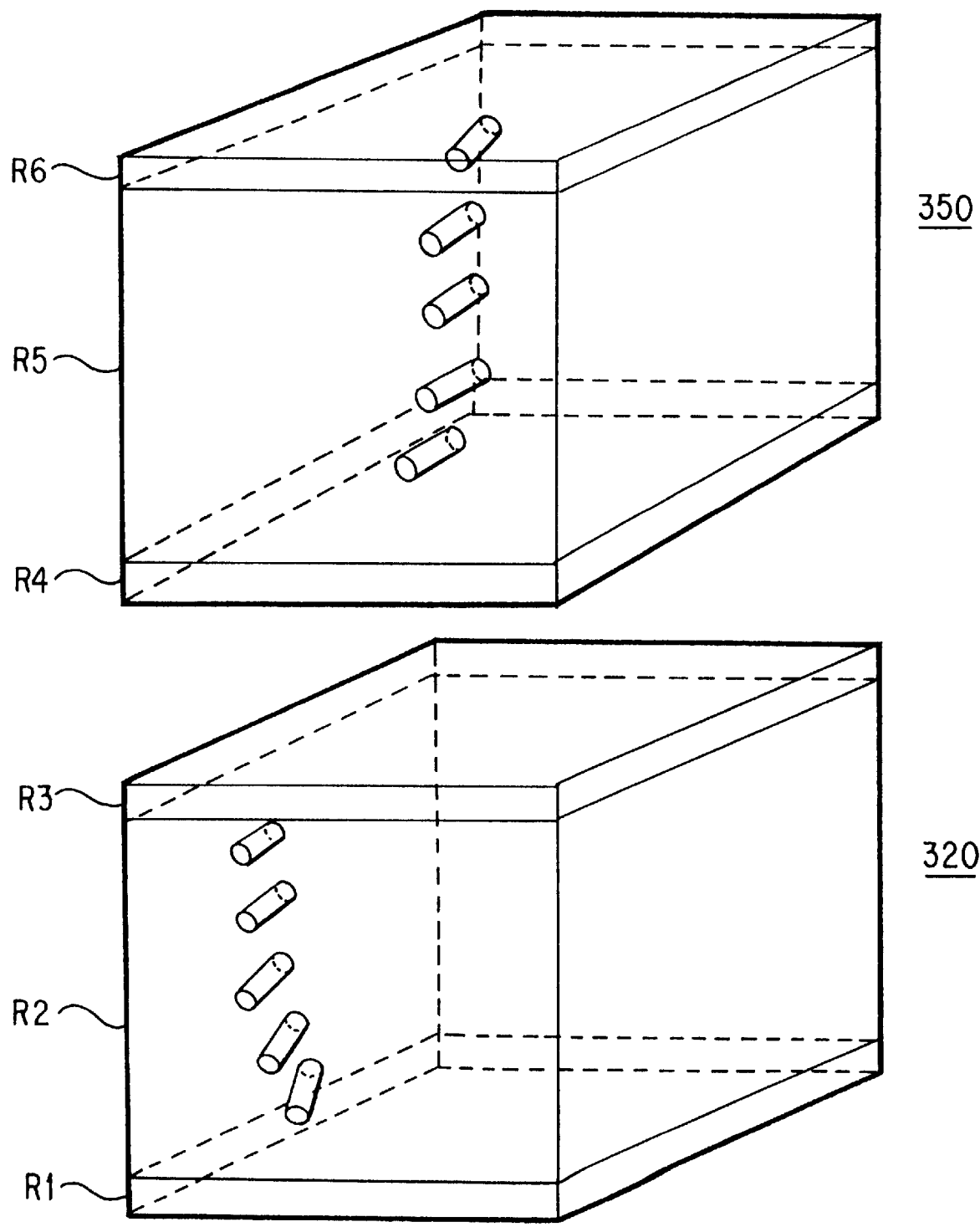
FIG. 12 is an exploded view of the compensating layers of the LCD shown in FIG. 11.

FIG. 12 is a view of the compensating layers 320 and 350 according to one aspect of the second embodiment. In FIG. 12, compensating layer 320 includes three layers (or sublayers) R1, R2 and R3. The layers R1 and R3 have optic axes that are substantially normal to the surface 360a. Similarly, compensating layer 350 includes three layers (or sublayers) R4–R6 and the optic axis of each of layers R4 and R6 is substantially normal to the surface 360a.

Compensating layer R2 of compensating layer 320, has an optic axis that varies through the thickness of the compensating layer R2. In compensating layer R2, the optic axis undergoes a change in a tilt angle θ' that corresponds to the tilt angle θ of the directors of the layers L1–L3 of the LC cell 330 in the state to be compensated (e.g., voltage FULL-ON). Because the optic axis of the layer R2 has no twist, its orientation is substantially parallel to the orientation of the rear substrate 331. Similarly, compensating layer R5 has a structure wherein the optic axis of compensating layer R5 varies throughout the thickness of layer R5 so that a tilt angle θ" of the optic axis of compensating layer R5 substantially mimics the tilt angle θ of the directors of the layers L3–L5 of the LC cell 330. The orientation of the layer R5 is substantially parallel to the orientation of the top substrate 332, as shown in FIG. 12.

Figure 13:
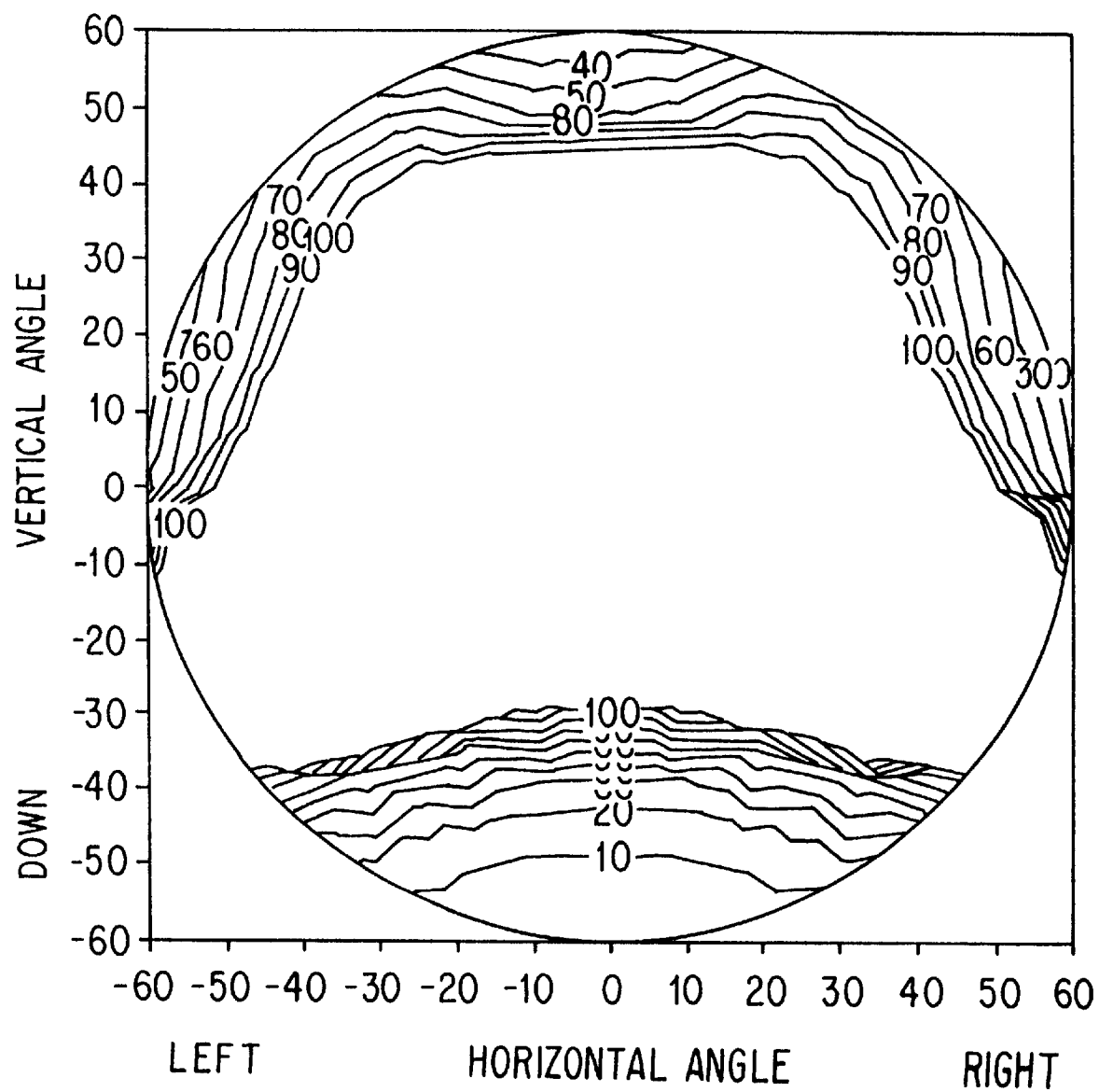
FIG. 13 is a first iso-contrast curve of the FIG. 11 LCD.

FIG. 13 is an iso-contrast curve showing the viewing performance of one aspect of the second embodiment. The LC cell in this embodiment is constructed in the e-mode. In this aspect of the second embodiment, Δnd of the LC cell 330 is approximately 400 nm, each of layers R3 and R4 have a Δnd of approximately −60 nm; layers R2 and R5 have Δnd of approximately −80 nm; and layers R1 and R3 have Δnd of approximately −70 nm. As shown in FIG. 13, the viewing angle performance of this aspect is substantially improved over the prior art shown in FIG. 7.

Figure 14:
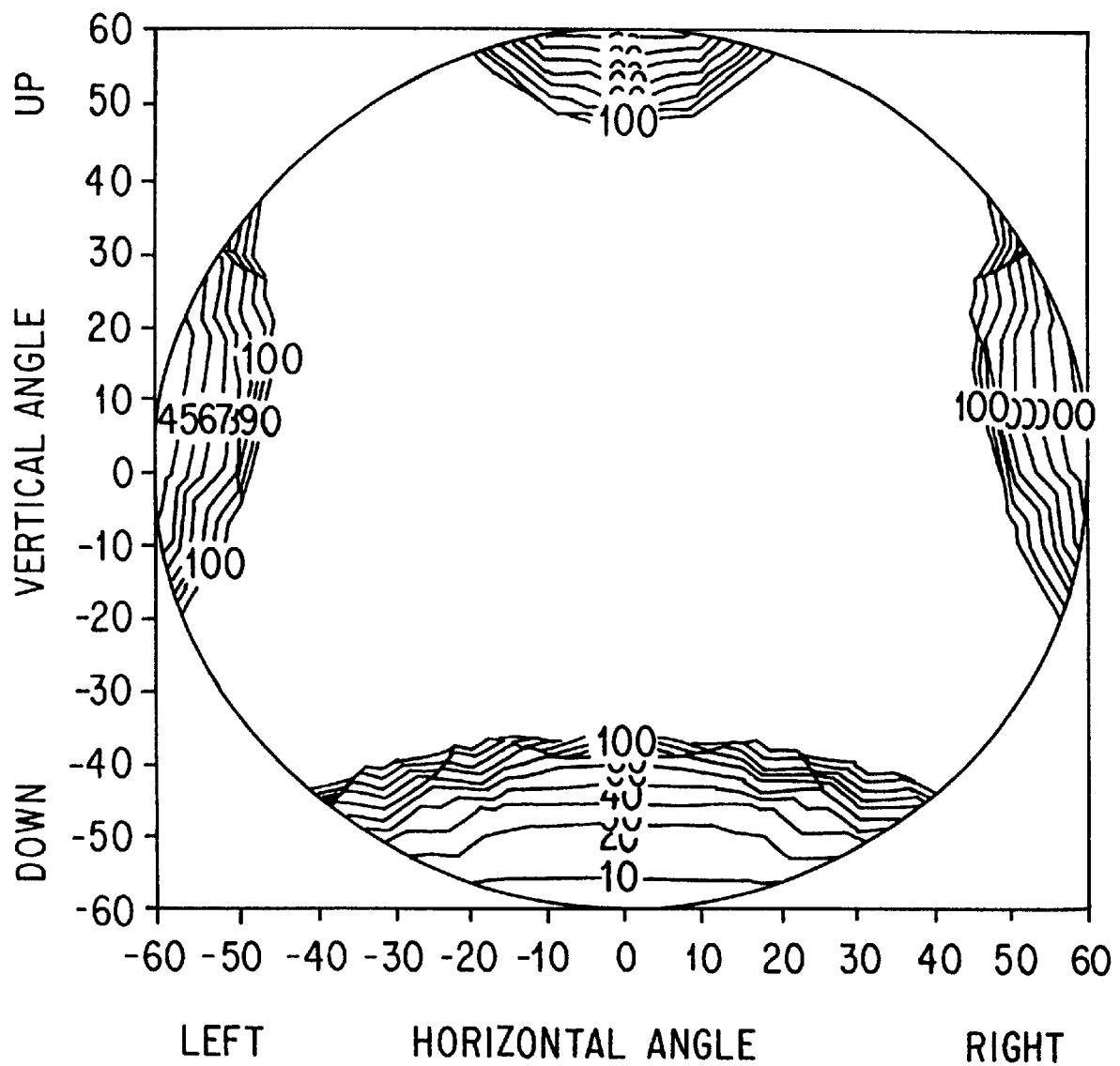
FIG. 14 is a second iso-contrast curve of FIG. 11 LCD.

FIG. 14 shows the viewing angle performance of another aspect of the second embodiment where Δnd of the LC cell 330 is approximately 320 nm, the Δnd of R1 and R6 is approximately −70 nm, the Δnd of R2 and R5 is approximately −80 nm, and the Δnd of R3 and R4 is approximately −40 nm. This aspect of the second embodiment is also constructed in the e-mode. As shown in FIG. 14, this aspect of the second embodiment also shows substantial improvement over the prior art shown in FIG. 7.

In another aspect of the second embodiment, the compensating layers 320 and 350 include only layers R2 and R5, respectively. In yet still another aspect of the second embodiment, the compensating layers 320 and 350 include layers R2 and R3 and R4 and R5, respectively, and layers R6 and R1 could be incorporated into analyzer 360 and rear polarizer 310, respectively.

The invention has been described with reference to the preferred embodiments thereof, which are illustrative and not limiting. Various changes may be made without departing from the spirit and scope of the invention as defined in the appended claims.

What is claimed is:

1. A liquid crystal display device, comprising:
   a rear linear polarizer;
   a front linear polarizer;
   a liquid crystal cell having liquid crystal material in a twisted mode, the liquid crystal cell disposed between the front polarizer and the rear polarizer;
   a first compensating layer, the first compensating layer including a plurality of sublayers; and
   a second compensating layer, the second compensating layer including a plurality of sublayers, wherein an optic axis of a second sublayer of the first compensating layer and an optic axis of a second sublayer of the second compensating layer each have a tilt that changes over a thickness of the sublayer, the optic axis of the second sublayer of the first compensating layer and the optic axis of the second sublayer of the second compensating layer each have substantially a same tilt angle as a tilt angle of the directors of the liquid crystal material in a state to be compensated, and further wherein the optic axis of the second sublayer of the first compensating layer and an optic axis of a second sublayer of the second compensating layer each have substantially a same twist angle as a twist angle of the directors of the liquid crystal material that are adjacent to the first and second compensating layers, respectively.

2. The liquid crystal display device of claim 1, wherein the liquid crystal cell has a positive birefringence and the first and the second compensating layers have a negative birefringence.

3. The liquid crystal display device of claim 1, wherein the liquid crystal cell has a negative birefringence and the first and the second compensating layers have a positive birefringence.

4. The liquid crystal display device of claim 1, the liquid crystal cell comprising:
   a rear substrate with rear electrodes, the rear substrate having a first rubbing direction; and
   a front substrate with front electrodes, the front substrate having a second rubbing direction, wherein the liquid crystal material is disposed between the front and the rear substrates and an optic axis of the liquid crystal cell rotates in a first direction, by a first amount, from the first rubbing direction to the second rubbing direction.

5. The liquid crystal display device of claim 4, further comprising:
   a backlight source; and
   a voltage source coupled to the front and the rear electrodes, the voltage source supplying a voltage that determines the state to be compensated.

6. The liquid crystal display device of claim 5, wherein the state to be compensated is a full-on voltage state.

7. The liquid crystal display device of claim 5, wherein the state to be compensated is an intermediate voltage state.

8. The liquid crystal display device of claim 5, the first compensating layer further comprising:
   a third sublayer adjacent to the front substrate, the third sublayer having an optic axis in a direction substantially normal to the front substrate; and
   a fourth sublayer adjacent to the second sublayer, the fourth sublayer having an optic axis in a direction substantially normal to the front substrate.

9. The liquid crystal display device of claim 5, the second compensating layer further comprising:
   a fifth sublayer adjacent to the rear substrate, the fifth sublayer having an optic axis in a direction substantially normal to the rear substrate; and
   a sixth sublayer adjacent to the second sublayer, the sixth sublayer having an optic axes in a direction substantially normal to the front substrate.

10. The liquid crystal display device of claim 5, wherein the state to be compensated is a voltage off state.

11. The liquid crystal display device of claim 4, further comprising:
    a voltage source coupled to the front and the rear electrodes, the voltage source supplying a voltage that determines the state to be compensated.

12. The liquid crystal display device of claim 1, wherein the liquid crystal cell is constructed in a e-mode.

13. The liquid crystal display device of claim 1, wherein the liquid crystal cell is constructed in a o-mode.

* * * * *